UNITED STATES PATENT OFFICE.

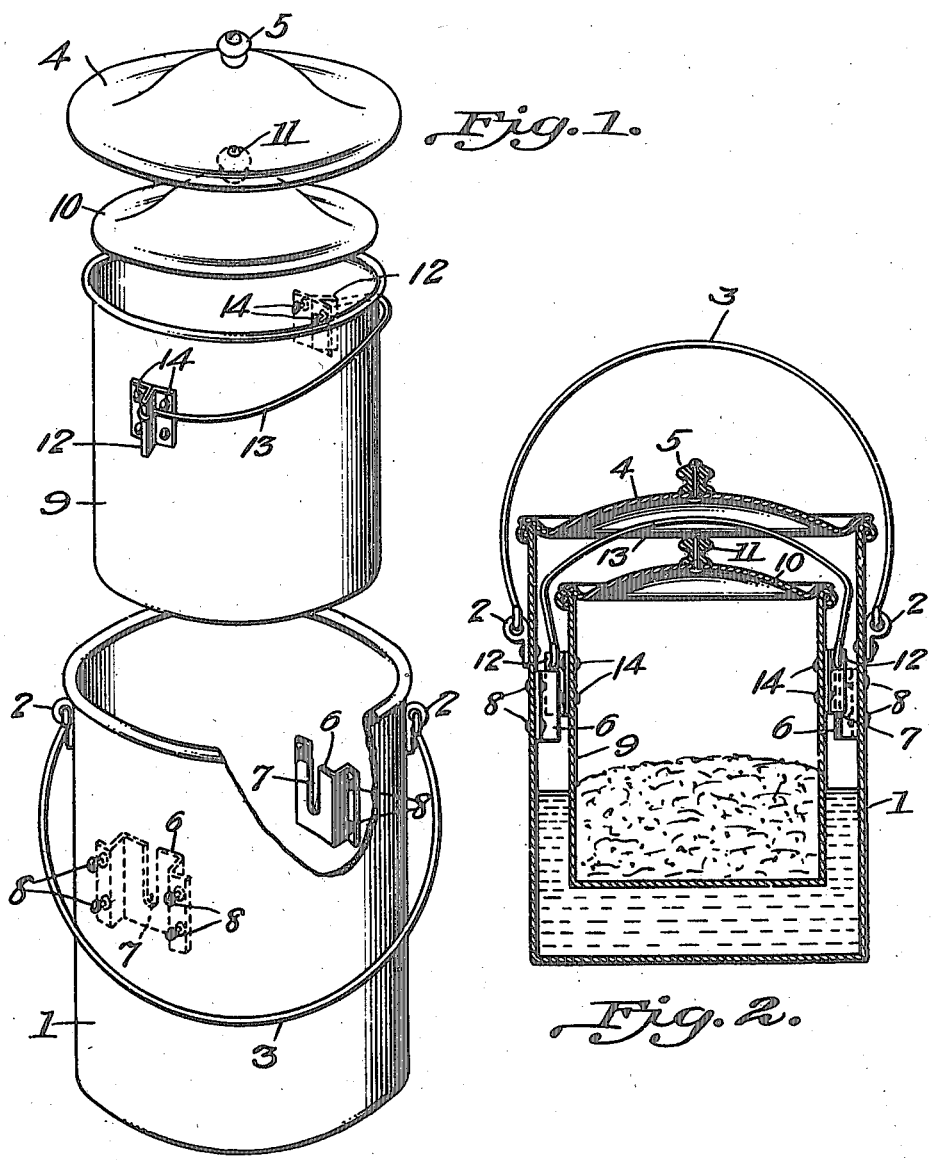

ELEANOR CONSTANCE EVANS, OF HAYMAN, COLORADO.

COOKING-STEAMER.

1,152,308.

Specification of Letters Patent.

Patented Aug. 31, 1915.

Application filed July 8, 1913. Serial No. 777,975.

*To all whom it may concern:*

Be it known that I, ELEANOR CONSTANCE EVANS, subject of Great Britain, residing at Hayman, in the county of Park and State of Colorado, have invented a new and useful Cooking-Steamer, of which the following is a specification.

This invention relates to cooking steamers, for rapidly and efficiently cooking cereals, meats, puddings, etc.

One of the objects of this invention is the provision of a cooking steamer comprising an outer vessel, and an inner vessel suspended within the outer vessel in a manner to provide for the free circulation of the steam over and around the inner vessel during the cooking operation.

Another object of this invention resides in the provision of a cooking steamer comprising an outer vessel and an inner vessel provided with means for suspending the inner vessel within the outer vessel and also for maintaining the bail of the inner vessel in a vertical position to provide for the ready grasping of the handle by the user, when withdrawing the inner vessel from within the outer vessel.

Other objects of this invention will be hereinafter more clearly set forth in the specification, defined in the claim, and illustrated in the accompanying drawings, in which, Figure 1 is a perspective view of the various parts of the invention, showing the parts in separated relation and elevated one above the other. Fig. 2 is a vertical sectional view of the invention, showing the parts in assembled relation.

Referring to the drawings, 1 denotes the outer vessel provided with the ears 2 in which is mounted the bail 3. The outer vessel 1 is provided with the lid 4 provided with the handle or knob 5. Within the outer vessel 1, are the brackets 6, each provided with the slot or seat 7. The brackets 6 are secured upon the inner wall of the outer vessel 1, through the medium of the bolts or rivets 8, at diametrically opposite points to each other, and at a point approximately midway between the top and bottom of the outer vessel 1.

9 denotes the inner vessel, provided with the lid 10 having the knob or handle 11. Upon the outer wall of the inner vessel 9 are arranged the projections 12 having formed therein adjacent their upper ends, apertures for receiving the ends of the bail 13. The projections 12 are secured upon the outer wall of the inner vessel 9, at diametrically opposite points, through the medium of the rivets or bolts 14, and at a point slightly remote from the upper edge of the inner vessel 9.

In use, the outer vessel 1 is formed of a sufficient greater diameter and length than the inner vessel 9, to provide for considerable space between the inner walls of the outer vessel 1 and the outer walls of the inner vessel 9, as well as to provide sufficient space between the lid 4 of the outer vessel 1, and the lid 10 of the inner vessel 9 for allowing the bail 13 of the inner vessel 9 to remain in vertical position beneath the lid 4 of the outer vessel 1, when the inner vessel 9 has been positioned within the outer vessel 1.

When the inner vessel 9 is placed within the outer vessel 1, the inner vessel 9 is so manipulated that the projections 12 thereof are seated within the seats 7 of the brackets 6 within the outer vessel 1, whereby the inner vessel 9 is efficiently suspended within the outer vessel 1. The looped ends of the bail 13 of the inner vessel 9 frictionally engage the upper surfaces of the brackets 6 at the entrance of the slots or seats 7 for maintaining the bail 13 of the inner vessel 9 in vertical position beneath the lid 4 of the outer vessel 1, whereby the bail 13 of the inner vessel 9 remains in a position to be readily grasped by the user of the cooking steamer when it becomes necessary to withdraw the inner vessel 9 from within the outer vessel 1, thus obviating the danger of the burning of the hands of the person.

The various parts constituting the cooking steamer may be made of any suitable material, and of any desired conformation, but I preferably form the parts as shown in the several views of the drawings, however, minor variations and alterations may be made therein without departing from the spirit of the invention or the scope of the claim.

Having described my invention, what I claim as new and desire to secure by Letters Patent, is:—

In a device of the class described, the combination with an outer vessel having a lid and an inner vessel, of brackets secured to the inner wall of said outer vessel, seats formed in said brackets, projections secured to the outer wall of said inner vessel for engaging said seats for suspending said inner vessel within said outer vessel, and a bail for said inner vessel secured to said projections and frictionally engaging said brackets when said vessels are in assembled relation, whereby said bail is held in vertical position.

ELEANOR CONSTANCE EVANS.

Witnesses:
CHRISTINE RYAN,
WILLIAM P. GWIN.